Patented Mar. 23, 1943

2,314,356

UNITED STATES PATENT OFFICE 2,314,356

COMPOUNDS OF THE ANTHRAQUINONE SERIES

Henry R. Lee, Pitman, N. J., and Charles A. Young, Wilmington, Del., assignors to E. I. du Pont de Nemours & Company, Wilmington, Del., a corporation of Delaware No Drawing. Application August 9, 1940, Serial No. 351,962

4 Claims. (Cl. 260—371)

This invention relates to the preparation of new compounds of the anthraquinone series and more particularly to the preparation of new water soluble salts of anthraquinone sulfonic acids which are particularly suitable for the dyeing of wool, silk, Nylon and related fibers and for use where water soluble derivatives of these compounds are normally employed.

The anthraquinone sulfonic acids are usually employed in the dyeing of wool and related fibers in the form of the alkali metal or ammonia salts of the sulfonic acids but in many cases the solubility of these salts is insufficient to permit proper application to the fiber or to permit the preparation of stock solutions in the necessary concentrations for convenient use.

It is therefore the object of this invention to produce salts of the anthraquinone sulfonic acids which have increased solubility in water and which exhibit improved dyeing properties when applied to wool, Nylon and related fibers.

We have found that the anthraquinone sulfonic acid colors generally referred to as acid wool dyes may be readily converted to alkanolamine salts and that the new alkanolamine salts of the sulfonic acids of the anthraquinone series exhibit improved solubility in water and apparently because of their improved solubility exhibit improved dyeing properties particularly in the dyeing of Nylon, wool and etc., from neutral dye baths.

The anthraquinone sulfonic acids which may be converted to the alkanolamine salts are any of the types known in this class in which the sulfonic acid group is attached directly to the anthraquinone nucleus or to a substituent on the anthraquinone ring and include the hydroxy-, amino- or substituted hydroxy- or amino- derivatives of the anthraquinone series, the sulfonic acids of the amino-dianthraquinonylamines and of the acidylamino anthraquinone naphthcarbazole types as more particularly illustrated by such examples as Alizarine Sky Blue B, Color Index No. 1088; Alizarine Cyanine Green, Color Index 1078; Alizarine Saphirol B, Color Index No. 1054; Alizarine Rubinol, Color Index No. 1091; the gray dyestuffs of U. S. P. 1,508,409; the blue dyestuffs of U. S. P. 2,170,385 and the brown dyestuffs of U. S. P. 2,093,355.

The alkanolamines which may be employed are the primary, secondary, or tertiary aliphatic amines which contain one or more hydroxyl groups such as mono-ethanolamine, diethanolamine, triethanolamine, methyl glucamine of the formula

HO—CH$_2$—(CHOH)$_4$CH$_2$—NH—CH$_3$ amino-trimethylol-methane of the formula

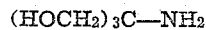

(HOCH$_2$)$_3$C—NH$_2$ and the condensation products of ethylene oxide and triethanolamine which are considered as having the formula

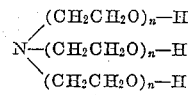

$$N \begin{cases} (CH_2CH_2O)_n-H \\ (CH_2CH_2O)_n-H \\ (CH_2CH_2O)_n-H \end{cases}$$

or similar compounds.

The following examples are given to illustrate the preparation of these soluble salts. The parts used are by weight.

Example 1

200 parts of Alizarine Sky Blue B (Color Index No. 1088) in the form of the free acid, are slurried with 1000 parts of water. The mass is heated at 95–100° C., and technical triethanolamine having a purity of approximately 93% is slowly added until the pH of the mass is 6.6–7.1. About 61 parts of the technical triethanolamine is required. The neutralized mass is then dried at 95–105° C. and pulverized. The triethanolamine salt of Alizarine Sky Blue B, thus obtained, is a dark blue powder which is over five times as soluble in water as the corresponding sodium salt. The new product has improved neutral dyeing properties on wool and Nylon and dyes these fibers from an acid bath in a manner similar to that of the sodium salt of the color.

When molecular equivalent proportions of Alizarine Cyanine Green (1,4-di(p-toluidino)-anthraquinone sulfonic acid) is reacted with triethanolamine as described in this example a product is obtained which has a solubility several times greater than the sodium salt of the same dyestuff.

Example 2

An aqueous press cake containing 50 parts of Alizarine Sky Blue B free acid is dispersed in 300 parts of water, and the slurry is heated to 95–100° C. Methyl glucamine is added at this temperature until the pH of the mass is 6.6–7.1. Approximately 20 parts of methyl glucamine are required. When the neutralization is complete, the mass is dried at 95–105° C. and pulverized. The product, which is the methyl glucamine salt of Alizarine Sky Blue B, is obtained in the form of a dark blue powder which possesses approximately twice the solubility in water as the corresponding sodium salt.

*Example 3*

15 parts of the free acid form of Alizarine Rubinol (Color Index No. 1091) are slurried with 150 parts of water at 90–100° C. Approximately 5 parts of technical triethanolamine are added slowly to the mass until all of the free acid of the color has been neutralized. The solution is then dried and the product pulverized. The triethanolamine salt of Alizarine Rubinol is obtained as a bright red powder which is over five times as soluble in water as the corresponding sodium salt.

The anthraquinone sulfonic acids which may be converted to these new alkanolamine salts may contain one or several sulfonic acid groups which may be attached either to a substituent on the anthraquinone nucleus or directly to the anthraquinone ring itself or both.

In place of reacting the anthraquinone sulfonic acid in the form of the free acid with the alkanolamine, the barium or calcium salt of such acid may be reacted with a salt of the alkanolamine such as the sulfate or the oxalate, so that on mixing the two reactants in aqueous medium a simple metathetical reaction occurs, whereby the secondary components are precipitated and can be readily separated from the alkanolamine salt of the color. The metathetical reaction or the neutralization of the free sulfonic acid with the free alkanolamine may be carried out at temperatures from below room temperature to the boiling point of the water solution.

We claim:

1. A dye for animal and related fibers comprising a water soluble alkanolamine salt of an anthraquinone sulfonic acid in which the alkanolamine radical contains at least two —OH groups, which compound exhibits materially increased solubility in water over the alkali metal salts of the corresponding sulfonic acid compound.

2. A dye for animal and related fibers comprising a water soluble alkanolamine salt of 1-amino-2-bromo-4-(p-toluidino)-anthraquinone sulfonic acid in which the alkanolamine group contains at least two hydroxyl groups, which compound exhibits materially increased solubility in water over the alkali metal salts of the corresponding sulfonic acid compound.

3. A dye for animal and related fibers comprising a water soluble alkanolamine salt of 1,4-di(p-toluidino)-anthraquinone sulfonic acid in which the alkanolamine group contains at least two OH groups, which compound exhibits materially increased solubility in water over the alkali metal salts of the corresponding sulfonic acid compound.

4. A dye for animal and related fibers comprising a water soluble triethanolamine salt of an anthraquinone sulfonic acid which compound exhibits materially increased solubility in water over the alkali metal salts of the corresponding sulfonic acid compound.

HENRY R. LEE.
CHARLES A. YOUNG.